United States Patent
Bansal et al.

(12)

(10) Patent No.: US 6,594,639 B1
(45) Date of Patent: Jul. 15, 2003

(54) REWARDING TELEPHONE CALLERS BASED ON CALL INFORMATION

(75) Inventors: Pradeep K. Bansal, Dayton, NJ (US); Lee Begeja, Gillette, NJ (US); Carroll W. Creswell, Basking Ridge, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/293,909

(22) Filed: Apr. 19, 1999

(51) Int. Cl.⁷ ............................................. G06F 17/60
(52) U.S. Cl. ........................................................ 705/14
(58) Field of Search ............................................ 705/14

(56) References Cited

U.S. PATENT DOCUMENTS

| | | | | | |
|---|---|---|---|---|---|
| 4,845,739 A | * | 7/1989 | Katz | ...................... | 379/92.03 |
| 5,774,870 A | * | 6/1998 | Storey | ..................... | 705/14 |
| 5,983,196 A | * | 11/1999 | Wendkos | ..................... | 705/14 |

FOREIGN PATENT DOCUMENTS

WO          WO 93/05483        *  3/1993

OTHER PUBLICATIONS

Brewer, Geoffrey, "The art of the dealer incentive", Incentive, vol. 166 No. 4, Apr. 1992: 42–45.*

* cited by examiner

Primary Examiner—Donald L. Champagne
(74) Attorney, Agent, or Firm—Oliff & Berridge

(57) ABSTRACT

A prize awarding device and method that awards a prize over a communications network. The prize award device generates a prize code for a contest prize winning call which is based on the call information of the contest prize winning call. The call information may include the location of the winning caller, the location of the party being called, a duration of the winning call, and time of day the winning call is placed and the like. The prize code may further be based on demographic information of the calling and/or called party. Based on the prize code, the prize award device selects a prize.

14 Claims, 7 Drawing Sheets

| TERMINAL ID | LOCATION CODE |
|---|---|
| 213-278-2145 | 10 |
| 703-555-6400 | 15 |
| 732-582-9214 | 72 |
| 908-949-1725 | 08 |
| 210-476-8202 | 36 |
| 301-555-6654 | 15 |
| 202-555-5527 | 15 |
| 817-296-6913 | 29 |

| CALLING LOCATION CODE | CALLED LOCATION CODE | PRIZE LEVEL | PRIZE CODE |
|---|---|---|---|
| 10 | 15 | 1 | A1 |
|  |  | 2 | A2 |
|  |  | 3 | A3 |
| 72 | 10 | 1 | B1 |
|  |  | 2 | B2 |
|  |  | 3 | B3 |
| ⋮ | ⋮ | ⋮ | ⋮ |

*FIG. 4*

| PRIZE CODE | NUMBER | PRIZE | NUMBER | PRIZE | | |
|---|---|---|---|---|---|---|
| 502 | 504 | 506 | 508 | 510 | | |
| A1 | 21 | STATUE OF LIBERTY | 1 | STATUE OF EMPIRE STATE | ... | |
| A2 | 10 | AIRFARE TO NY | 2 | | ... | |
| A3 | 1 | | | | ... | |
| B1 | | | | | | |
| B2 | | | | | | |
| B3 | | | | | | |
| ... | | | | | | |

| PRIZE WINNER | TOTAL NUMBER OF PRIZES | PRIZE | DATE | PRIZE | DATE | . . . |
|---|---|---|---|---|---|---|
| TERMINAL 106 | 3 | STATUE OF LIBERTY | | TICKET | | |
| . . . | | | | | | |

REWARDING TELEPHONE CALLERS BASED ON CALL INFORMATION

BACKGROUND OF THE INVENTION

1. Field of Invention

The invention relates to a method and system for awarding prizes over a communications network based on the call information of a winning communication.

2. Description of Related Art

Presently, in the field of long distance communications there exists a large amount of competition for customers between long distance service providers. Recently, dial-around services have become very popular as a way for customers to choose a long-distance service provider when placing a call. A dial-around service permits a user to dial a long-distance carrier code, prior to placing a call, which in turn selects a long-distance carrier service regardless of which company is the default long distance service provider for that terminal. Long distance phone service providers intensely compete for a large market share of customers using the dial-around services. Therefore, there is a need for new technology to distinguish a communication provider's service, and thereby attract a greater market share of customers.

SUMMARY OF THE INVENTION

The invention provides a method for awarding a prize over a communications network. The method includes generating a prize code based on call information of a prize winning call. The method further includes selecting a prize based on the prize code.

When a call is placed on a communications network, the call is initially determined to be either a winning or non-winning call. Winning calls are subsequently examined to generate a prize code from the call information of the call. Call information can include the location of the winning caller, the location of the party being called, the winning caller's characteristics, a duration of the winning call, time of day the winning call is placed and the like.

The prize code may further be determined based on a prize level which is an indication of the quality of the prize within a particular prize code range. The caller placing the winning call can be immediately notified of their prize during the winning call or notified at a later time and date.

BRIEF DESCRIPTION OF THE DRAWINGS

The invention will be described with reference to the accompanying drawings, in which like elements are referred to with like numbers, and in which:

FIG. 3 is an exemplary data structure for storing location codes corresponding to particular terminals;

FIG. 4 is an exemplary data structure for storing prize codes corresponding to location codes and prize levels;

FIG. 5 is an exemplary data structure for storing a prize code table showing the prizes corresponding to each prize code;

DETAILED DESCRIPTION OF PREFERRED EMBODIMENTS

Figure 1:
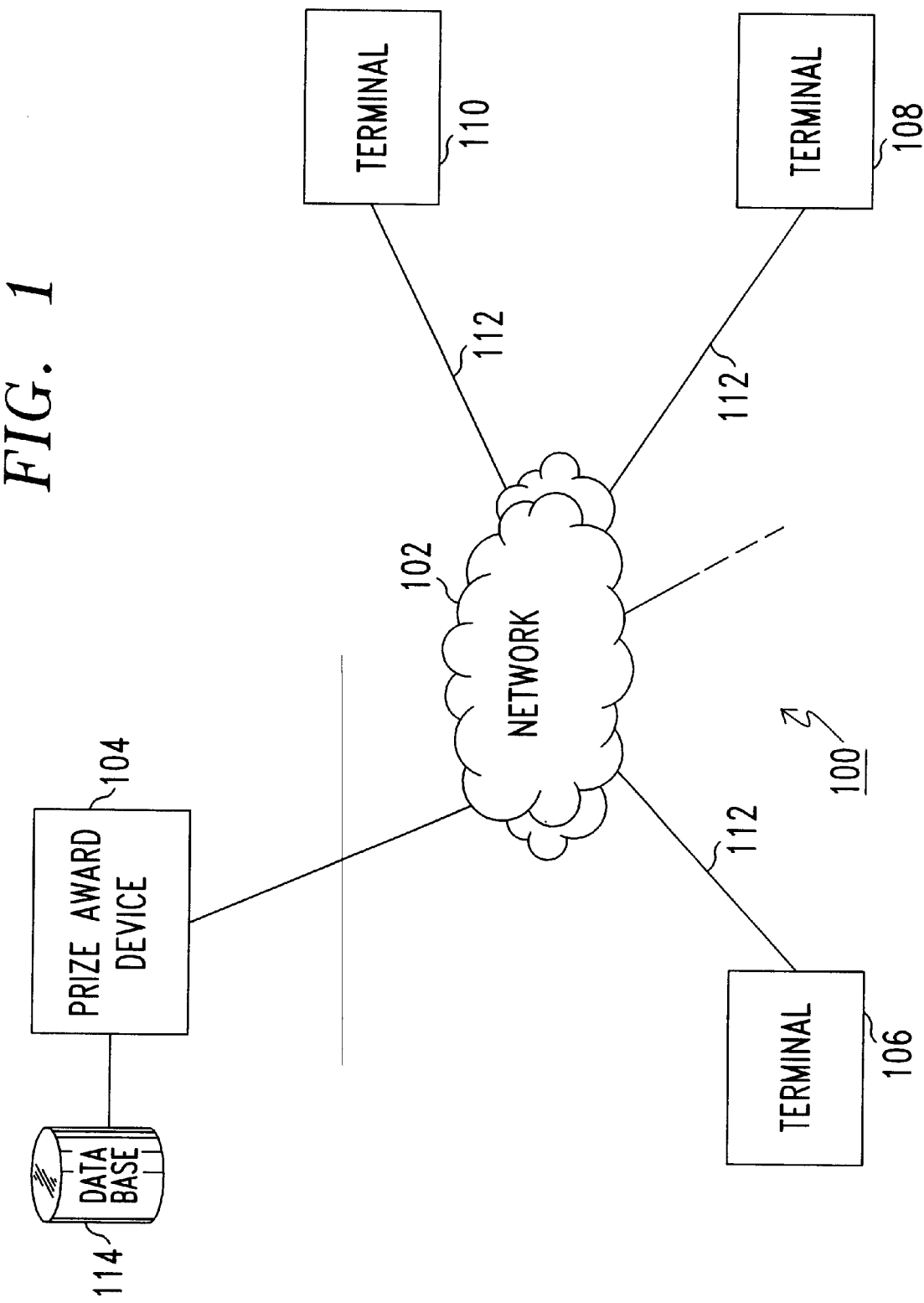
FIG. 1 is a block diagram of an exemplary prize awarding system.

FIG. 1 shows a prize award system 100 that includes a network 102 and a prize award device 104 coupled to the network 102. A plurality of terminals 106, 108, 110 are connected with the network 102 through communication links 112. The prize award device 104 is capable of selectively awarding a prize to a terminal placing a winning call over the network 102.

The terminals 106, 108 and 110 may be devices of any type that allow for the transmission and/or reception of communication signals. For example, the terminals 106, 108 and 110 may be land-line telephones, cellular telephones, computers, personal digital assistants, video telephones, video conference apparatus, smart or computer assisted televisions, and the like. For purposes of the following description of the present invention, it will be assumed that the terminals 106, 108 and 110 are telephones.

The terminals 106, 108 and 110 are in communication with the network 102 through communications links 112. These communications links 112 may be any type of connection that allows the transmission of information. Some examples include conventional telephone lines, fiber optic lines, direct serial connection, cellular telephone connections, satellite communication links, local area networks (LANs), intranets, and the like.

The communication signals are received by the network 102 and are routed in the network 102, by way of, for example, routers and switches (not shown) to a destination terminal. The routing may be performed by switches such as Lucent Technologies Inc. 5ESS and 4ESS switches, for example, which are generally known it the art.

The network 102 may be a single network or a plurality of networks of the same or different types. For example, the network 102 may include a local telephone network (such as a Bell Atlantic telephone network) in connection with a long distance network (such as an AT&T long distance telephone network). Further, the network 102 may be a data network or a telecommunications network in connection with a data network. Any combination of telecommunications and data networks may be used without departing from the spirit and scope of the present invention. For purposes of discussion, it will be assumed that the network 102 is a single telecommunications network.

The prize award device 104 selects a winning call and extracts call information of the winning call to identify a prize which is then customized based on the call information. Winning calls may be selected at random, or by other even more sophisticated selection methods, such as making the first one hundred phone calls placed to or from a certain geographical location over a certain time period.

For example, if the terminal 106 (in San Francisco) calls the terminal 108 (in New York City) and the call is selected as a winning call, the prize award device 104 selects a prize based on information such as the location of the winning caller, the location of the party being called, a duration of the winning call, the time of day the winning call is placed, or like call information. The prize award device 104 may obtain the terminal ID information from the header information, such as the automatic number identification (ANI) information, of the call and the call information from a profile containing information corresponding to the calling terminal 106 that has been previously collected and stored. For a prize winner calling from New York, the prize may be an item representative of New York City such as a scaled down model of the Statue of Liberty or a round-trip airfare between San Francisco and New York City.

The quality of the-prize is determined by the prize level. When the prize award device 104 determines that a caller is a winning caller, it can then further determine the prize level. In the above example, the round-trip airfare between San Francisco and New York City would have a higher prize level than that of the model of the statute of liberty since it is much more expensive and of a higher quality.

The prize level can be randomly chosen by the prize awarding device 104 or other methods of determining the prize level may be used without departing from the spirit and scope of the present invention. For example, the prize level may be increased for a particular winning caller each additional time that caller wins. Therefore, if a winning caller has no previous wins, their prize level may be 1. If the same caller wins at a later date, the prize level may be increased to 2 and so on. This method encourages participation by rewarding users of the services, such as dial-around, calling card, and the like, who use the service multiple times.

Alternatively, the prize level may be selected in accordance with a form of weighted probabilities. Under such a scheme, the chances of a winning caller receiving a low prize level would be much greater than the chances of a winning caller receiving a high prize level. This method can be very beneficial since it keeps the number of expensive prizes low while enticing greater use of the network 110.

Figure 2:
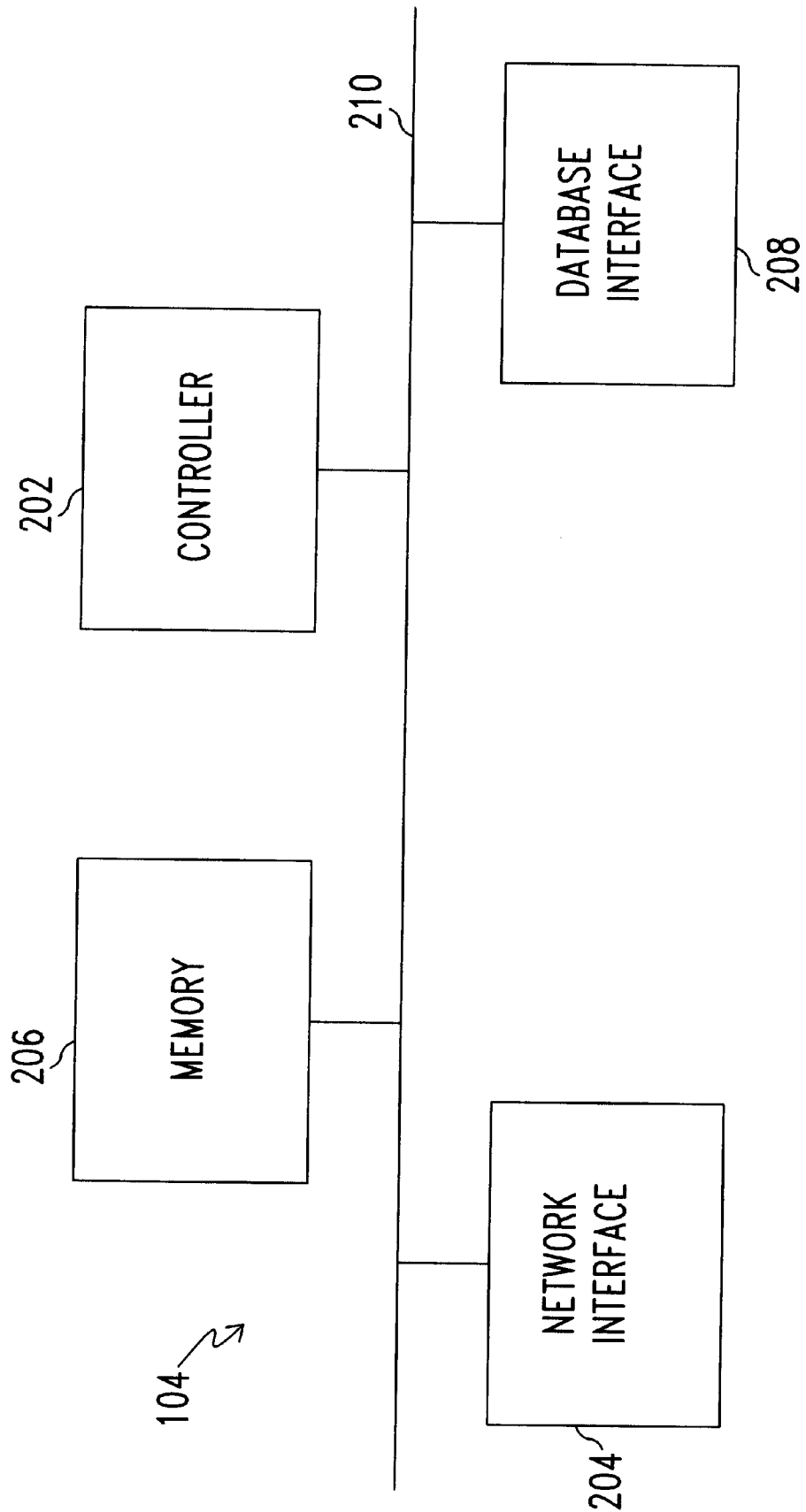
FIG. 2 is an exemplary block diagram of the prize award device of FIG. 1.

FIG. 2 is a block diagram of a prize award device 104. The prize award device 104 may include a controller 202, a network interface 204, a memory 206, and a database interface 208. The above components are coupled together via a control/data bus 210. The above architecture is exemplary only. Other architectures of the components may be used without departing from the spirit and scope of the present invention.

When a user places a call from terminal 106 to terminal 108, for example, over a network 102 participating in prize award system 100, the prize awarding device 104 connected with the participating network 102 may select whether the call is a winning call or a non-winning call. Winning calls can be selected by the controller 202 using numerous selection techniques. Methods include having the controller 202 select calls at random, a certain number of winning calls over a fixed period of time, a certain percentage of calls as winning calls over a fixed period of time, and the like. The controller 202 may increase the number of winning calls during special days, such as Christmas or Mother's Day, when the calling volume is especially heavy. Alternatively, the controller 202 may adjust the number of winning calls to encourage people to place calls during particular periods of time when either rates are higher or call volume is low.

After identifying the call to be a prize winning call, the controller 202 may retrieve information from the terminals, via the network interface 204, and store it in memory 206. The call information can be taken from the billed telephone number of the party either placing or receiving the call obtained from header information contained in communication signals from the terminal. Alternatively, the terminal users could be asked to respond to a series of queries, whereby their responses would be used to generate the call information. The controller 202 generates a prize code based on the call information stored in memory 206. As described in greater detail below, prize codes are a function of the call information. The relationship between call information and prize codes is described in FIGS. 3–6.

Based on the prize code, the controller 202 accesses the database 114 via database interface 208. The controller retrieves a prize that corresponds to the prize code. The controller 202 can either notify the prize winning caller of the prize or store the prize winning caller's ID and corresponding prize for later retrieval.

FIG. 3, shows an exemplary data structure 300 for storing location codes that correspond to terminal IDs. The data structure 300 includes a field 302 for location codes and a field 304 for terminal IDs. The terminal IDs are used to identify each terminal 106, 108 and 110 to the connected network 102. The terminal ID may be a telephone number of the terminal, an IP address, domain name, terminal identification number or the like.

The location code is used to indicate the geographical location of the respective terminal 106, 108, and 110. For example, a terminal 106 with terminal ID 213-278-2145 is associated with location code 10. Location codes can easily be extracted from the billed telephone number (BTN) in a header of a terminal communication signals since the BTN already contains area code information concerning the geographical location of the calling terminal.

The location code groups terminal IDs of a similar geographical region into the same group. By way of example, if it became desirable to divide the United States into three geographical regions, the eastern region, the midwest region, and the western region, this could easily be accomplished by grouping all the eastern terminal IDs into a first location code, all the midwestern terminals IDs into a second location code, and all the western terminals IDs into a third location code. Accordingly, all terminals in the United States would be assigned one of the three location codes.

Alternatively, the location codes could be used to select a finite amount of locations, such as major cities with a population of over 1 million, and group all the terminals within that location and the geographically adjacent locations into the same location code. Thus, for example, a city and the surrounding suburbs may be assigned the same location code.

For example, if one of the major cities to be selected were Washington, D.C., all of the terminals within the city of Washington, D.C. along with all of the surrounding suburbs of Washington, D.C., such as Alexandria, Va., Arlington, Va. and College Park, Md., would be assigned the same location code. As shown in FIG. 3, the terminal IDs 703-555-6400 and 301-555-6654 represent terminals in the adjacent suburbs of Washington, D.C., and are assigned a location code of 15. Additionally, terminal ID 202-555-5527 is a terminal located in Washington, D.C. and it receives the same location code of 15. Therefore, a winning call from any of the terminals would be treated as a call originating from Washington, D.C. As later described, the presence of a location code greatly simplifies the customized prize selection process.

Alternatively, densely populated areas may be separated into various location codes based on generalized demographic information. For example, Manhattan may be given a first location code and the Bronx may be given a different location code due to the generalized economic demographics of the two regions. In this way, prizes may be awarded while taking into consideration the relative economic differences between regions.

FIG. 4 shows an exemplary data structure 400 for storing prize codes corresponding to location codes and prize levels. Fields 402 and 404 contain location codes of the calling and called parties, respectively, and contain all possible combinations of location codes. Field 406 is a prize level which is generally used to indicate the quality or the cost of the prizes to be given away. When the prize award device 104 determines a call to be a winning call, the prize award device 104 selects a prize level and, hence, a quality of the prize based on the call information. Field 408 contains the prize codes which correspond to the respective location codes in fields 402, 404 and the prize level 406. For example, if a calling location code 402 is 10 and a called party location code 404 is 15, and the prize level 406 is determined to be 2, then the prize code would be A2.

By way of example, again assume that terminal 106 has terminal ID 213-555-2145 and is physically located in San Francisco, and that terminal 108 has terminal ID 703-555-6400 and is physically located in New York City. Furthermore, assume that terminal 106 is placing a call to terminal 108 over the network 102, and that the call is determined to be a winning call having a prize level of 1 by the prize award device.

At this point, the controller 202 gathers the respective terminal IDs from terminals 106 and 108 and stores the terminal IDs in memory 206. The controller 202 then accesses data structure 300 that is stored in database 114 and determines the location codes 302 for each terminal. In this example, terminal 106 having terminal ID 213-555-2145 would have location code 10, and terminal 8 having terminal ID 703-555-6400 would have location code 15. Both of the location codes for the terminals are then stored in memory 206.

Next, the controller 202 accesses data structure 400 stored in database 114 and determines a prize code 408. As shown in FIG. 4, the calling location code 402 is the location code of terminal 106 which is 10, the called location code 404 is 15, and the prize level is 1. Accordingly, the controller determines that the prize code 408 is A1. The prize code is then stored in memory 206.

Once a prize code is generated, controller 202 may retrieve data structure 500 shown in FIG. 5 to select a prize based on the prize code. The data structure 500 may include a plurality of fields 506 and 510 for identifying prizes associated with prize codes in field 502. Furthermore, fields 504 and 508 represent the number of the corresponding prizes already given away.

As shown in FIG. 5, if the prize code is A1, the winner is eligible for a scaled down model of the Statute of Liberty or the Empire State Building. Furthermore, field 504 indicates that 21 Statutes of Liberty previously have been given away, and 9 models of the Empire State Building have also been given away.

Figure 6:
FIG. 6 is an exemplary data structure for storing a profile for each terminal.

FIG. 6 shows a data structure 600 of awards already given to each of the terminals 106, 108 and 110. Field 602 is the terminal ID and field 604 is the number of prizes that a particular terminal has already been awarded. The controller 202 can access data structure 600 to determine a prior prize history of a terminal. Based on the prior prize history, the controller 202 can increase the prize level of the winning caller if the caller has won a certain number of times in the past, as described above. Additionally, fields 606 through 612 list a description of the prizes and dates that each prize was awarded. This data structure 600 is particularly useful in avoiding redundancy when awarding prizes. Once a prize is selected, the controller 202 may notify a prize warehouse via the network interface which will mail the prize directly to the address of the winning terminal.

Figure 7:
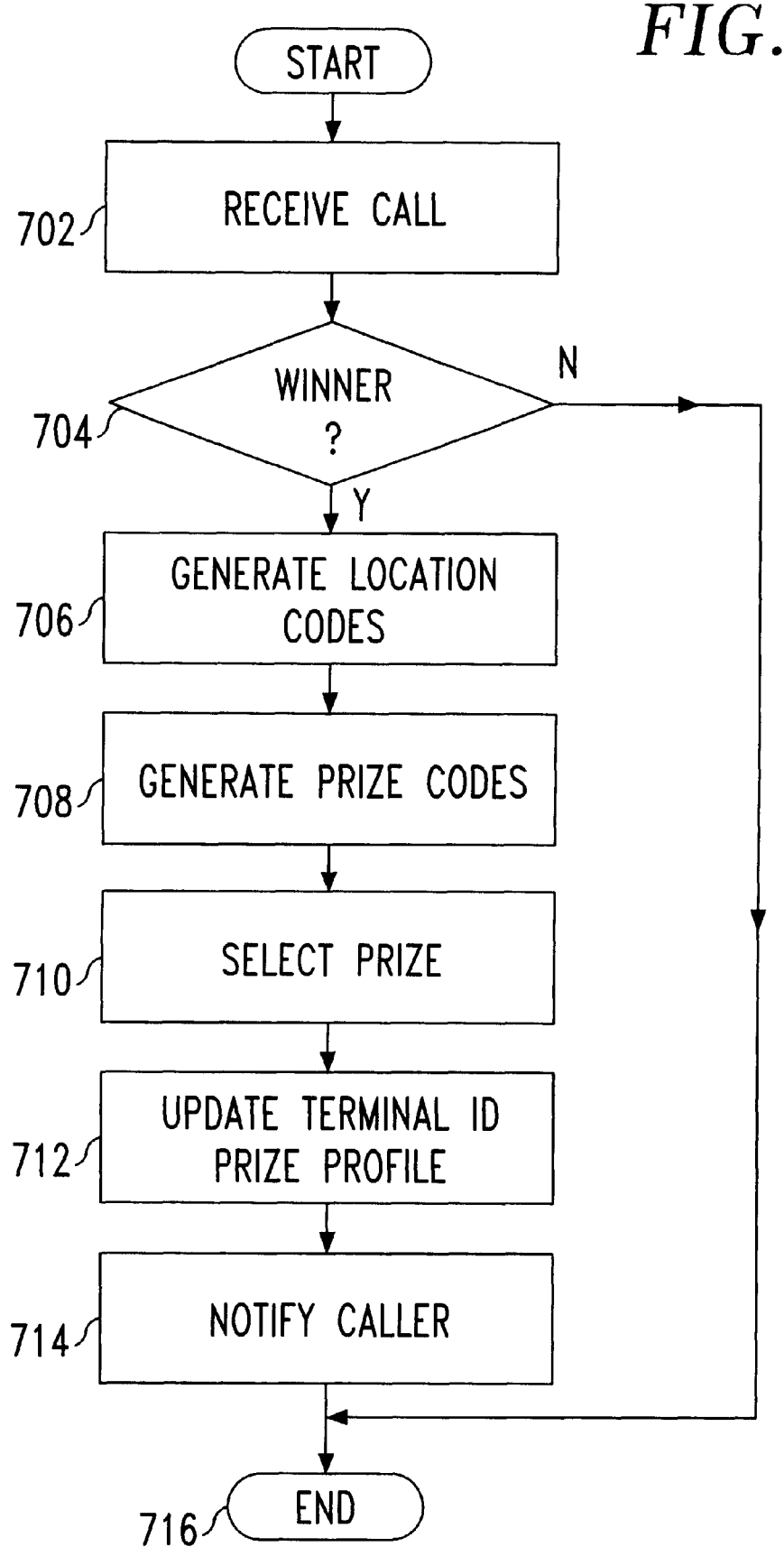
FIG. 7 is an exemplary flowchart outlining one method of awarding prizes according to the present invention.

FIG. 7 shows an exemplary flowchart outlining one method of awarding prizes for calls placed over the communications network 102 according to the present invention. As shown in FIG. 7, in step 702, the controller 202 receives a call placed over the communications network 102, and goes to step 704. In step 704, the controller 202 determines whether the call is a winning or a non-winning call. If the call is a non-winning call, then the controller 202 goes to step 716; otherwise, the controller 202 goes to step 706. In step 716 the controller 202 ends the process and no prize is awarded.

In step 706, the controller 202 determines the location codes for both the prize winning calling terminal and the terminal being called. This step utilizes the location code data structure 300 of FIG. 3. The controller 202 goes to step 708 where the controller 202 accesses data structure 400 through the database interface 208 to generate a prize code based on the respective location codes.

In step 710, the controller 202 uses the determined prize code to select a customized prize for the prize winning caller utilizing the data structure 500. Next, in step 712 the prize awarded is recorded in data structure 600 to update the prize profile of the particular terminal in order to minimize awarding redundant prizes.

In step 714, the prize award device 104 notifies the prize winning caller. This can be accomplished during the winning call with an audible, visual, or graphical announcement, or alternatively notification may occur at a later time. Possible methods of later notification include e-mail, posting to a website, a later automated phone call from the prize award device 104 to the winning terminal, having the potential users call a central number to access a list of winners stored on a database, through the U. S. Postal system, and the like.

As an example of the operation of this embodiment, consider a user John in Washington, D.C. who places a phone call to Kim in New York City over the network 102. After placing the call, the prize award device 104 selects John's call as a winning call using a random selection process to select the winning call from all calls placed on a given day. The prize award device 104 retrieves the data from the network 102 to determine that John, in Washington, D.C., is calling Kim, in New York City.

The prize award device 104 then determines a prize code and prize level based on the call information and selects a prize from database 114 corresponding to the prize code. The prize award device 104 then sends a message to John's terminal, which indicates to John that he has won a prize. John chooses to listen to the prize announcement during his phone call. The prize award device 104 then plays a message that John has won two round-trip plane tickets to New York City. The prize award device 104 then confirms his mailing address before sending the tickets in the mail to John. John then continues his call with Kim.

While the above embodiment describes the prize codes as being determined in part based on location codes of the calling and/or called party, locating other information about the calling and called parties may be used to customize the awarded prize to the particular parties involved. For example, a code may be determined from demographic information of the calling and/or called parties, such as age, income, race, personal preferences, occupation, and the like. This information may be stored in user profiles in the user profile database.

As shown in FIG. 2, the method of this invention is preferably implemented on a programmed processor. However, the prize award device 104 can also be implemented on a general purpose or special purpose computer, a programmed microprocessor or microcontroller and peripheral integrated circuit elements, an Application Specific Integrated Circuit (ASIC) or other integrated circuit, a hardware electronic circuit such as a discrete element circuit, a programmable logic device such as a PLD, PLA, FPGA or PAL, or the like. In general, any device on which a finite state machine capable of implementing the flowchart shown in FIG. 7 can be used to implement the prize award device 104 functions of this invention.

While this invention has been described in conjunction with the specific embodiments thereof, it is evident that many alternatives, modifications and variations will be apparent to those skilled in the art. Accordingly, preferred embodiments of the invention as set forth herein are intended to be illustrative not limiting. There are changes that may be made without departing from the spirit and scope of the invention.

What is claimed is:

1. A method for selecting, via a network, a prize to be awarded to a user, the method comprising:

generating a prize code based on call information of a prize winning call and on a location code other than an area code; and selecting a prize based on the prize code.

2. The method of claim 1, further comprising notifying a caller placing the prize winning call of said prize.

3. The method of claim 1, wherein said call information includes at least one of a location, demographic information, personal preferences, and occupation of a calling party or a party being called.

4. The method of claim 1, wherein selecting the prize is further based upon additional criteria including at least one of a duration of the winning call and a time of the winning call.

5. The method of claim 1, wherein generating a prize code further includes determining a prize level wherein said prize is selected based on said prize level.

6. The method of claim 1, wherein said call information includes both a location of the winning caller and a location of a party being called, and said prize code is selected based on both of said locations.

7. The method of claim 2, wherein notifying the caller of said prize occurs during the duration of said winning call.

8. An apparatus, in connection with a network, for selecting a prize to be awarded to at least one user of the network, the apparatus comprising:

a network interface;

a database that contains a listing of prizes corresponding to a plurality of prize codes; and a controller coupled to the network interface and the database, the controller generating the prize code based on call information of a prize winning call and on a location code other than an area code, and selecting the prize based on the prize code from the database.

9. The apparatus of claim 8, wherein the controller further notifies a caller placing the contest prize winning call of said prize.

10. The apparatus of claim 8, wherein the call information includes at least one of a location, demographic information, personal preferences, and occupation of a calling party or a party being called.

11. The apparatus of claim 8, wherein the controller selects the prize based upon additional criteria including at least one of a duration of the winning call and a time of the winning call.

12. The apparatus of claim 8, wherein said prize code further includes a prize level, said prize being further selected based on said prize level.

13. The apparatus of claim 8, wherein said call information includes both a location of the winning caller and a location of a party being called, and said prize code is selected based on both of said locations.

14. The apparatus of claim 9, wherein the controller notifies the caller of said prize occurs during the duration of said winning call.

* * * * *